(12) United States Patent
Powell

(10) Patent No.: US 8,100,582 B1
(45) Date of Patent: Jan. 24, 2012

(54) TEMPERATURE PROBE

(76) Inventor: Bradley J. Powell, Guilford, CT (US)

(*) Notice: Subject to any disclaimer, the term of this patent is extended or adjusted under 35 U.S.C. 154(b) by 576 days.

(21) Appl. No.: 12/315,900

(22) Filed: Dec. 8, 2008

Related U.S. Application Data

(60) Provisional application No. 61/007,263, filed on Dec. 13, 2007.

(51) Int. Cl.
*G01K 13/02* (2006.01)

(52) U.S. Cl. ........................................ 374/138; 374/148

(58) Field of Classification Search .................. 374/16, 374/138, 135, 148
See application file for complete search history.

(56) References Cited

U.S. PATENT DOCUMENTS

| | | | | |
|---|---|---|---|---|
| 4,644,806 A | * | 2/1987 | Flagg et al. | 73/863.58 |
| 5,025,661 A | * | 6/1991 | McCormack | 73/180 |
| 5,331,849 A | * | 7/1994 | Hedberg et al. | 73/182 |
| 6,609,825 B2 | * | 8/2003 | Ice et al. | 374/138 |
| 2008/0229770 A1 | * | 9/2008 | Liu | 62/225 |

* cited by examiner

*Primary Examiner* — Yaritza Guadalupe-McCall
(74) *Attorney, Agent, or Firm* — Ted Masters

(57) ABSTRACT

A temperature probe for measuring the temperature of an airstream containing ice particles includes a fin which is positioned upstream of a temperature sensor. The fin causes the ice particles to be directed away from the temperature sensor. Both the fin and the temperature sensor are disposed in an unsheltered location where they are directly exposed to the airstream.

29 Claims, 4 Drawing Sheets

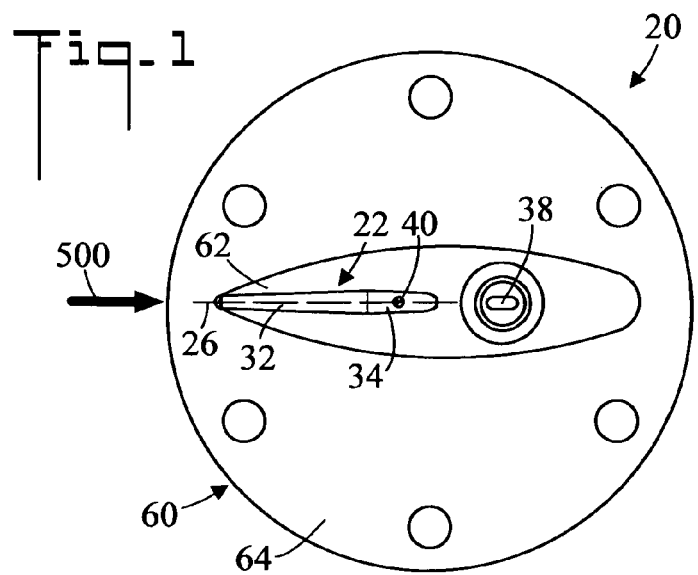
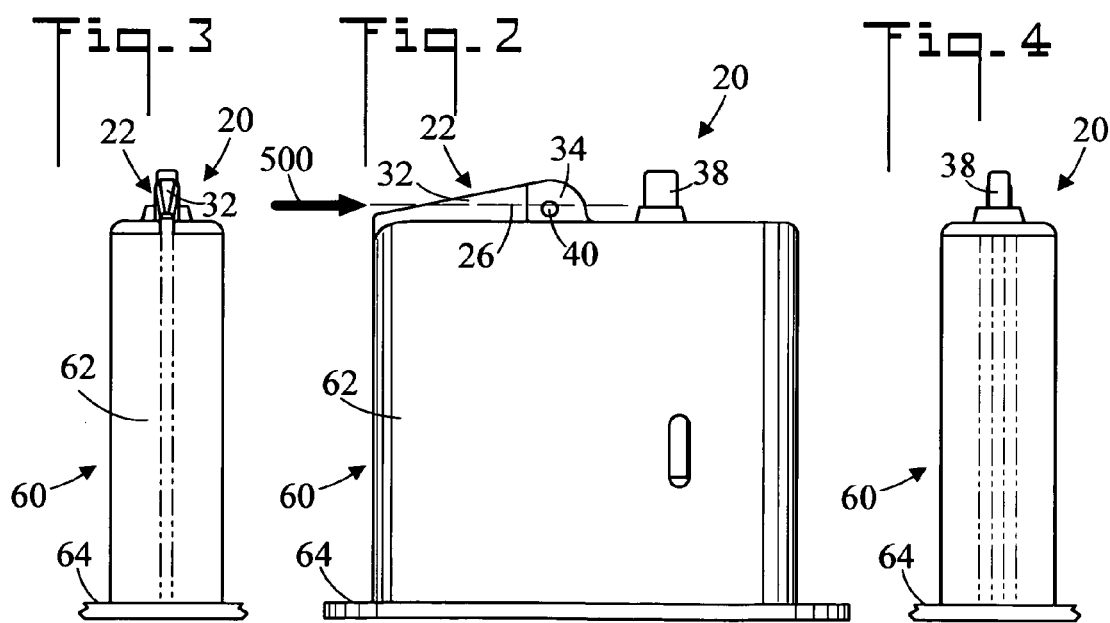

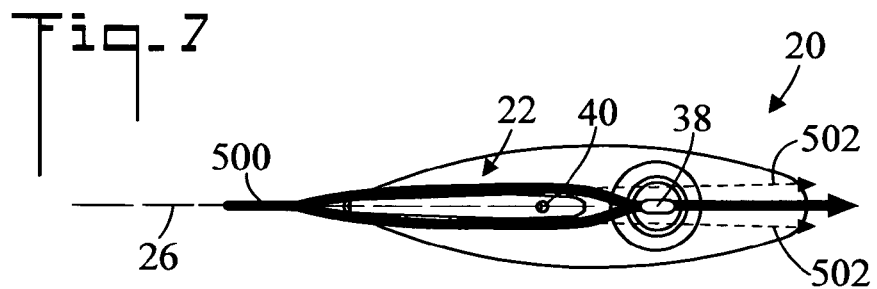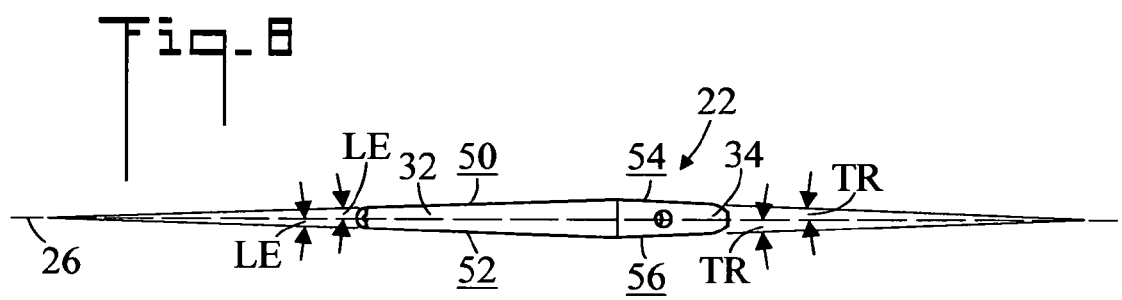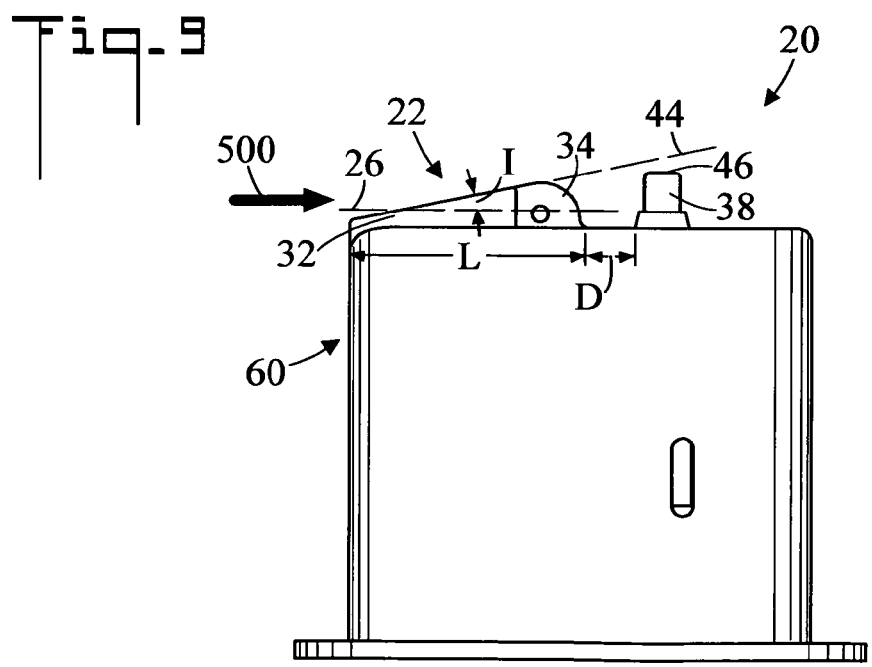

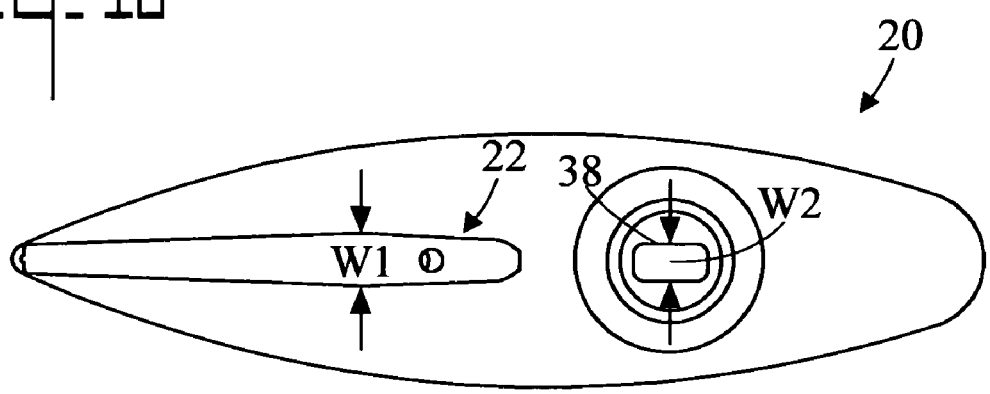
Fig_10

TEMPERATURE PROBE

CROSS REFERENCE TO RELATED APPLICATION

This application claims the filing benefit under 35 U.S.C. §119(e) of U.S. Provisional Application No. 61/007,263, filed Dec. 13, 2007, which is herein incorporated by reference.

TECHNICAL FIELD

The present invention pertains generally to temperature measurement, and more particularly to a temperature probe used to measure air temperature outside an aircraft.

BACKGROUND OF THE INVENTION

Aircraft temperature probes are by nature of the application highly susceptible to corrupted temperature readings and catastrophic loss of time response due to ice that builds up on the temperature sensing element. To circumvent this problem in prior art probes, the airflow enters a scoop that is electrically heated and is diverted at some angle relative to the vertical axis of the sensor. After diversion, the air encounters a sheltered temperature sensor which is protected by the scoop. For example, U.S. Pat. Nos. 6,609,825 and 6,651,515 employ this technology. Alternatively, probes may use air pressure suction to draw the air at some angle relative to the vertical axis of the probe so that particles of ice and water are separated out of the flow. The consequence of diverting air as per the prior technology is that there is either a large degree of air stagnation (when scoops are involved) or a large reduction in pressure and airflow (when suction is involved) to the extent that time response is reduced and errors are introduced. Moreover, sensors fabricated using prior art technology are notoriously high power consumption requirements and are very costly and complex in terms of manufacturing requirements.

BRIEF SUMMARY OF THE INVENTION

The present invention is directed to a temperature probe which employs a fin which is positioned upstream from a temperature sensor. Both the fin and the temperature reside in an unsheltered location where they are directly exposed to the airstream. This design results in a temperature probe which (1) avoids ice build up on the temperature sensor, (2) provides a faster response than prior art devices, (3) and can operate without a heater, even in ice producing weather conditions. In the present invention, air is not diverted at any angle relative to the vertical axis of the probe and there is no inlet scoop. Rather, the air travels straight at the temperature sensing element and there is a thin "fin" upstream of the element that separates out ice and water the particles without any "downward" diversion of the air at any angle relative to the vertical axis of the probe.

The advantages of the present design are:
  The probe can have a lower distance from the aircraft fuselage due to not requiring an air path down the axis of the probe
  Reduced manufacturing cost since no scoop or heater is required.
  Minimal reduction in time response due to avoidance of stagnation and pressure loss.
  The upstream fin prevents ice from forming on the temperature sensor.
  Allows airflow to the temperature sensor even in the presence of icing conditions.

The temperature probe design disclosed herein has greatly simplified manufacturing requirements as compared to the prior art (i.e. the prior art involves multiple-piece housing and an intertwined cable heater throughout the body). Therefore, temperature probes utilizing the present invention can be produced at lower cost to support emerging low-cost market segments such as "light jets" and "uninhabited air vehicles", not to mention the overall aviation market considering the high desirability of reduced cost, weight, and power.

In accordance with a preferred embodiment of the invention, a temperature probe for measuring the temperature of an airstream containing ice particles includes a fin and a temperature sensor disposed behind the fin. The fin causes the ice particles to be directed away from the temperature sensor.

In accordance with an aspect of the invention, the fin has a tapered leading portion and a tapered trailing portion.

In accordance with another aspect of the invention, the fin has a centerline, a first leading surface, and an opposite second leading surface. The first leading surface and second leading surface each form a leading portion angle of between about 2.0° and about 2.5° with the centerline.

In accordance with another aspect of the invention, the fin has a first trailing surface, and an opposite second trailing surface. The first trailing surface and the second trailing surface each form a trailing portion angle of between about 2.0° and about 2.5° with the centerline.

In accordance with another aspect of the invention, the temperature probe further includes a base, wherein the fin and the temperature sensor are disposed in an unsheltered location on top of the base.

In accordance with another aspect of the invention, the temperature probe is heaterless, yet still capable of providing accurate temperature readings in the airstream containing ice particles.

In accordance with another aspect of the invention, the fin is upwardly inclined from the tapered leading portion to the tapered trailing portion.

In accordance with another aspect of the invention, the fin has a centerline, and the fin is upwardly inclined at an inclination angle with respect to the centerline, the inclination angle being less than 30°.

In accordance with another aspect of the invention, the inclination angle is about 11.5°.

In accordance with another aspect of the invention, the upward inclination defines an inclined line which extends rearwardly from the tapered trailing portion of the fin. The temperature sensor has a top portion which is disposed below the inclined line.

In accordance with another aspect of the invention, the fin has a surface which includes a plurality of depressions.

In accordance with another aspect of the invention, the fin has a length and a tapered trailing portion. The temperature sensor is disposed a distance from the tapered trailing portion. The distance is less than the length.

In accordance with another aspect of the invention, the fin has a first width and the temperature sensor has a second width. The first width is between about 0.8 and about 1.2 times the second width.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a top plan view of a temperature probe in accordance with the present invention;

FIG. 2 is a side elevation view of the temperature probe;

FIG. 3 is a front elevation view of the temperature probe;

FIG. 4 is a rear elevation view of the temperature probe;

FIG. 7 is a top plan view of the temperature probe showing airstream flow around a fin;

FIG. 8 is an enlarged top plan view of the fin;

FIG. 9 is a side elevation view of the temperature probe showing the fin; and,

FIG. 10 is an enlarged top plan view of the temperature probe.

DETAILED DESCRIPTION OF THE INVENTION

Figure 5:
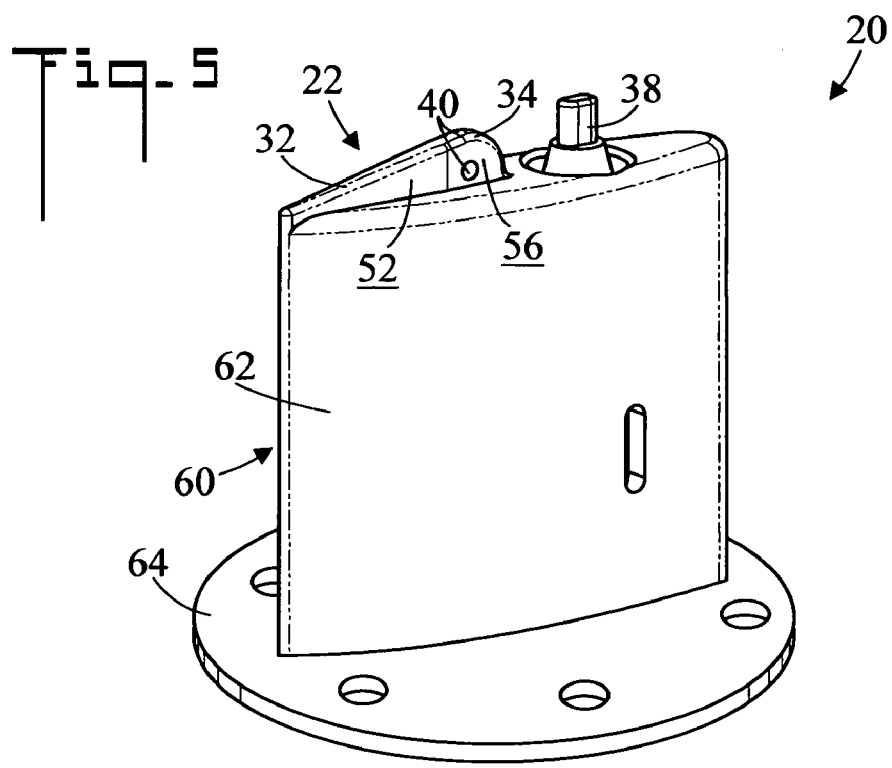
FIG. 5 is a front perspective view of the temperature probe.
Figure 6:
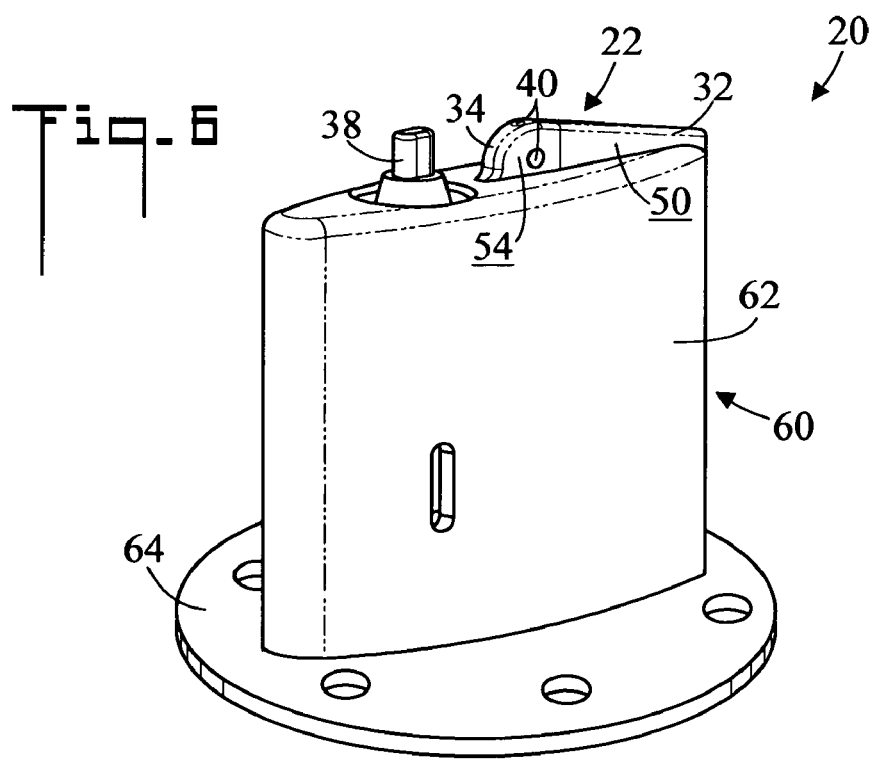
FIG. 6 is an opposite rear perspective view of the temperature probe.

Referring initially to FIGS. 1-6, there are illustrated top plan, side elevation, front elevation, rear elevation, front perspective, and opposite rear perspective views respectively of a temperature probe for measuring the temperature of an airstream 500 containing ice particles 502 (also refer to FIG. 7 and the associated discussion), the temperature probe generally being designated as 20. Temperature probe 20 includes a deflector for diverting airstream 500. In the shown embodiment the deflector is a fin 22. Fin 22 has a centerline 26 which in operation is oriented parallel to the direction of airstream 500 (refer to FIG. 7 and the associated discussion). Fin 22 has a tapered leading portion 32 (upstream facing) and a tapered trailing portion 34 (downstream facing) as is best seen in FIG. 1. Tapered leading portion 32 and tapered trailing portion 34 ensure that airstream 500 laminarly flows around fin 22. Fin 22 is upwardly inclined from tapered leading portion 32 to tapered trailing portion 34 as is best seen in FIG. 2. That is, when viewed from the side, fin 22 is shaped like an upwardly climbing ramp.

A temperature sensor 38 is disposed behind fin 22. That is, temperature sensor 38 is adjacent tapered trailing portion 34 of fin 22, and therefore downstream of fin 22 during operation. Temperature sensor 38 measures airstream temperature, and can be any of (1) a resistance temperature detector, (2) a thermistor, or (3) a (thermocouple). In operation fin 22 splits airstream 500 causing ice particles 502 to be directed away from temperature sensor 38 (refer to FIG. 7 and the associated discussion). As such, fin 22 acts as an inertial separator.

Fin 22 has a surface which includes a plurality of depressions 40 (three in the shown embodiment). Depressions 40 can be holes, dimples, cavities, indentations, and the like to create low pressure and thereby promote laminar airstream 500 flow around fin 22 (refer also to FIG. 7 and the associated discussion).

Temperature probe 20 further includes a base 60 which has a tapered leading portion 62, and a mounting flange 64. Tapered leading portion 62 reduces ice buildup on base 60. Fin 22 and temperature sensor 38 are disposed in an unsheltered location on top of base 60, and thereby are directly in airstream 500 (refer to FIG. 7 and the associated discussion). The term "unsheltered" means that there is no structure (such as a scoop, a housing, or other element) surrounding fin 22 and temperature sensor 38. As such, temperature sensor 38 provides a faster and more accurate temperature response than do temperature probes which divert the airstream through a scoop, housing, or other element before contacting a sheltered temperature sensor. The housings etc. of prior art temperature probes reduce the airspeed of the airstream 500. Conversely, in the present invention, temperature sensor 38 is directly exposed to airstream 500 without airspeed reduction, and as such there is no increase in temperature sensor 38 time response. It may be appreciated that base 60 may take other structural forms.

Further, the temperature probe 20 of the present invention can be heaterless (not requiring a heater) while still capable of providing accurate temperature readings in the airstream containing ice particles. As compared to certain prior art temperature probes, the present invention has no inlet scoop which would accumulate ice, thus blocking airflow, thus necessitating a heater.

FIG. 7 is a top plan view of the temperature probe 20 showing airstream 500 flow around fin 22. Fin 22 splits airstream 500 (bold line) and causes airstream 500 to laminarly flows around both sides of fin 22 and reunite or "refocus" at temperature sensor 38. In the present invention, airstream 500 is only minimally deflected by fin 22. This is in contrast to conventional temperature probes which substantially bend the airstream through a scoop, housing, or other element. Fin 22 further serves as an inertial separator for deflecting ice particles 502 away from temperature sensor 38. The heavier ice particles 502 do not laminarly follow the contour of fin 22, but are rather outwardly projected past temperature sensor 38 so that no ice build up occurs on temperature sensor 38.

FIG. 8 is an enlarged top plan view of fin 22. Fin 22 has a planar first leading surface 50, an opposite planar second leading surface 52, and centerline 26 (refer also to FIGS. 5 and 6). First leading surface 50 and second leading surface 52 each form a leading portion angle LE of between about 2.0° and about 2.5° with centerline 26. Similarly, fin 22 has a planar first trailing surface 54, and an opposite planar second trailing surface 56 (refer also to FIGS. 5 and 6). First trailing surface 54 and second trailing surface 56 each form a trailing portion angle TR of between about 2.0° and about 2.5° with centerline 26. In operation, airstream 500 (refer to FIG. 7) is deflected across the surfaces of each side of fin 22. This small deflection is enough to separate heavier ice and water particles and prevent them from striking downstream temperature sensor 38 (refer to FIG. 7). The use of a thin fin 22 allows temperature probe 20 to operate in all weather conditions without performance degradation as would occur if fin 22 were not present. The design of fin 22 is such that in flight ice particles cannot build up to the extent that airflow to the temperature sensor 38 (refer to FIG. 7) is blocked. The taper on the trailing surface of fin 22, along with surface depressions 40. causes dry air (i.e. air devoid of water and ice particles) to divert back to temperature sensor 38 without airspeed reduction.

FIG. 9 is a side elevation view of temperature probe 20 showing fin 22. Fin 22 is upwardly inclined at an inclination angle I with respect to centerline 26, wherein inclination angle I is less than 30°. In a preferred embodiment of the invention, inclination angle I is about 11.5°. Further, the upward inclination defines an inclined line 44 which extends rearwardly from tapered trailing portion 34 of fin 22. Temperature sensor 38 has a top portion 46 which is disposed below inclined line 44. That is, fin 22 shields temperature sensor 38 from ice buildup, and thereby allows temperature probe 20 to operate in icing conditions without a heater. It is further noted that in the present invention, there is no downward (toward base 60) deflection of airstream 500 as is the case in prior art devices.

Fin 22 has a length L. Temperature sensor 38 is disposed a distance D from said tapered trailing portion 34 of fin 22, wherein distance D is less than length L.

FIG. 10 is an enlarged top plan view of temperature probe 20. Fin 22 has a first width W1, and temperature sensor 38 has a second width W2. First width W1 is between about 0.8 and about 1.2 times second width W2. In an embodiment of the invention, W1 is 0.073 inches, and W2 is 0.062 inches.

The preferred embodiments of the invention described herein are exemplary and numerous modifications, variations, and rearrangements can be readily envisioned to achieve an equivalent result, all of which are intended to be embraced within the scope of the appended claims.

I claim:

1. A temperature probe for measuring the temperature of an airstream containing ice particles, said temperature probe comprising:
    an inertial separator;
    a temperature sensor disposed behind said inertial separator;
    said inertial separator and said temperature sensor disposed in an unsheltered location where they are directly exposed to the airstream;
    said inertial separator having two sides; and,
    said inertial separator splitting the airstream and causing the airstream to flow around both said sides of said inertial separator and reunite at said temperature sensor.

2. The temperature probe according to claim 1, further including:
    said inertial separator causing the ice particles to be outwardly projected past said temperature sensor so that no ice build up occurs on said temperature sensor.

3. The temperature probe according to claim 1, further including:
    the airstream travelling directly at said temperature probe without any downward diversion.

4. The temperature probe according to claim 1, further including:
    said inertial separator having a tapered leading portion and a tapered trailing portion; and,
    said inertial separator being upwardly inclined from said tapered leading portion to said tapered trailing portion.

5. The temperature probe according to claim 4, further including:
    said inertial separator having a centerline; and,
    said inertial separator upwardly inclined at an inclination angle with respect to said centerline, said inclination angle being less than 30°.

6. The temperature probe according to claim 5, further including:
    said inclination angle being about 11.5°.

7. The temperature probe according to claim 1, further including:
    said inertial separator having a surface; and,
    said surface including a plurality of dimples which promote laminar airstream flow around said inertial separator.

8. The temperature probe according to claim 1, further including:
    said inertial separator having a length and a tapered trailing portion;
    said temperature sensor disposed a distance from said tapered trailing portion; and,
    said distance being less than said length.

9. The temperature probe according to claim 1, further including:
    said inertial separator having a first width;
    said temperature sensor having a second width; and,
    said first width being between about 0.8 and about 1.2 times said second width.

10. A temperature probe for measuring the temperature of an airstream containing ice particles, said temperature probe comprising:
    a fin;
    a temperature sensor disposed behind said fin;
    said fin causing the ice particles to be directed away from said temperature sensor;
    said fin having a tapered leading portion and a tapered trailing portion;
    said fin having a centerline, a first leading surface, and an opposite second leading surface; and,
    said first leading surface and said second leading surface each forming a leading portion angle of between about 2.0° and about 2.5° with said centerline.

11. A temperature probe for measuring the temperature of an airstream containing ice particles, said temperature probe comprising:
    a fin;
    a temperature sensor disposed behind said fin;
    said fin causing the ice particles to be directed away from said temperature sensor;
    said fin having a tapered leading portion and a tapered trailing portion;
    said fin having a centerline, a first trailing surface, and an opposite second trailing surface; and,
    said first trailing surface and said second trailing surface each forming a trailing portion angle of between about 2.0° and about 2.5° with said centerline.

12. A temperature probe for measuring the temperature of an airstream containing ice particles, said temperature probe comprising:
    a fin;
    a temperature sensor disposed behind said fin;
    said fin causing the ice particles to be directed away from said temperature sensor; and,
    said temperature probe being heaterless, yet still capable of providing accurate temperature readings in the airstream containing ice particles.

13. A temperature probe for measuring the temperature of an airstream containing ice particles, said temperature probe comprising:
    a fin;
    a temperature sensor disposed behind said fin;
    said fin causing the ice particles to be directed away from said temperature sensor;
    said fin having a tapered leading portion and a tapered trailing portion;
    said fin being upwardly inclined from said tapered leading portion to said tapered trailing portion;
    said upward inclination defining an inclined line which extends rearwardly from said tapered trailing portion of said fin; and,
    said temperature sensor having a top portion which is disposed below said inclined line.

14. A temperature probe for measuring the temperature of an airstream containing ice particles, said temperature probe comprising:
    a fin;
    a temperature sensor disposed behind said fin;
    said fin causing the ice particles to be directed away from said temperature sensor;
    said fin having a tapered leading portion and a tapered trailing portion;
    said fin having a centerline, a first leading surface, and an opposite second leading surface;
    said first leading surface and said second leading surface each forming a leading portion angle of between about 2.0° and about 2.5° with said centerline;
    said fin having a first trailing surface, and an opposite second trailing surface;

said first trailing surface and said second trailing surface each forming a trailing portion angle of between about 2.0° and about 2.5° with said centerline;

a base;

said fin and said temperature sensor disposed in an unsheltered location on top of said base;

said temperature probe being heaterless, and yet still capable of providing accurate temperature readings in the airstream containing ice particles;

said fin being upwardly inclined from said tapered leading portion to said tapered trailing portion;

said fin upwardly inclined at an inclination angle with respect to said centerline, said inclination angle being less than 30°;

said upward inclination defining an inclined line which extends rearwardly from said tapered trailing portion of said fin;

said temperature sensor having a top portion which is disposed below said inclined line;

said fin having a surface; and, said surface including a plurality of depressions.

15. A temperature probe for measuring the temperature of an airstream containing ice particles, comprising:

an inertial separator;

a temperature sensor disposed behind said inertial separator, so that said inertial separator splits the airstream before it reaches said temperature sensor;

a base; and, said inertial separator and said temperature sensor disposed in an unsheltered location on top of said base where they are directly exposed to the airstream.

16. The temperature probe according to claim 15, further including:

said inertial separator causing the ice particles to be outwardly projected past said temperature sensor so that no ice build up occurs on said temperature sensor.

17. The temperature probe according to claim 15, further including:

said inertial separator having a tapered leading portion and a tapered trailing portion; and, said inertial separator being upwardly inclined from said tapered leading portion to said tapered trailing portion.

18. The temperature probe according to claim 17, further including:

said inertial separator having a centerline; and, said inertial separator upwardly inclined at an inclination angle with respect to said centerline, said inclination angle being less than 30°.

19. The temperature probe according to claim 18, further including:

said inclination angle being about 11.5°.

20. The temperature probe according to claim 15, further including:

said inertial separator having a surface; and, said surface including a plurality of dimples which promote laminar airstream flow around said inertial separator.

21. The temperature probe according to claim 15, further including:

said inertial separator having a length and a tapered trailing portion;

said temperature sensor disposed a distance from said tapered trailing portion; and, said distance being less than said length.

22. The temperature probe according to claim 15, further including:

said inertial separator having a first width;

said temperature sensor having a second width; and, said first width being between about 0.8 and about 1.2 times said second width.

23. A temperature probe for measuring the temperature of an airstream, comprising:

a fin;

a temperature sensor disposed behind said fin;

a base;

said fin and said temperature sensor disposed in an unsheltered location on top of said base;

said fin having a tapered leading portion and a tapered trailing portion;

said fin having a centerline, a first leading surface, and an opposite second leading surface; and, said first leading surface and said second leading surface each forming a leading portion angle of between about 2.0° and about 2.5° with said centerline.

24. A temperature probe for measuring the temperature of an airstream, comprising:

a fin;

a temperature sensor disposed behind said fin;

a base;

said fin and said temperature sensor disposed in an unsheltered location on top of said base;

said fin having a tapered leading portion and a tapered trailing portion;

said fin having a centerline, a first trailing surface, and an opposite second trailing surface; and, said first trailing surface and said second trailing surface each forming a trailing portion angle of between about 2.0° and about 2.5° with said centerline.

25. A temperature probe for measuring the temperature of an airstream, the airstream containing ice particles, the temperature probe comprising:

a fin;

a temperature sensor disposed behind said fin;

a base;

said fin and said temperature sensor disposed in an unsheltered location on top of said base;

said temperature probe being heaterless, yet still capable of providing accurate temperature readings in the airstream containing ice particles.

26. A temperature probe for measuring the temperature of an airstream, the airstream containing ice particles, the temperature probe comprising:

a fin;

a temperature sensor disposed behind said fin;

a base;

said fin and said temperature sensor disposed in an unsheltered location on top of said base;

said fin having a tapered leading portion and a tapered trailing portion;

said fin being upwardly inclined from said tapered leading portion to said tapered trailing portion;

said upward inclination defining an inclined line which extends rearwardly from said tapered trailing portion of said fin; and, said temperature sensor having a top portion which is disposed below said inclined.

27. A temperature probe for measuring the temperature of an airstream, comprising:

an inertial separator;

said inertial separator having a tapered leading portion and a tapered trailing portion;

said inertial separator being upwardly inclined from said tapered leading portion to said tapered trailing portion;

said inertial separator having a centerline;

said inertial separator upwardly inclined at an inclination angle with respect to said centerline, said inclination angle being less than 30°, and a temperature sensor disposed behind said inertial separator.

28. The temperature probe according to claim 27, further including:

said inclination angle being about 11.5°.

29. A temperature probe for measuring the temperature of an airstream, comprising:

a fin;

said fin having a tapered leading portion and a tapered trailing portion;

said fin having a centerline, a first leading surface, and an opposite second leading surface;

said first leading surface and said second leading surface each forming a leading portion angle of between about 2.0° and about 2.5° with said centerline;

said having a first trailing surface, and an opposite second trailing surface;

said first trailing surface and said second trailing surface each forming a trailing portion angle of between about 2.0° and about 2.5° with said centerline; and, a temperature sensor disposed behind said fin.

* * * * *

UNITED STATES PATENT AND TRADEMARK OFFICE
CERTIFICATE OF CORRECTION

| | | |
|---|---|---|
| PATENT NO. | : 8,100,582 B1 | Page 1 of 1 |
| APPLICATION NO. | : 12/315900 | |
| DATED | : January 24, 2012 | |
| INVENTOR(S) | : Bradley J. Powell | |

It is certified that error appears in the above-identified patent and that said Letters Patent is hereby corrected as shown below:

Col. 8, line 59 should read -- posed below said inclined line.

Signed and Sealed this
Twenty-ninth Day of May, 2012

David J. Kappos
*Director of the United States Patent and Trademark Office*